US010089461B1

(12) United States Patent
Ha et al.

(10) Patent No.: US 10,089,461 B1
(45) Date of Patent: Oct. 2, 2018

(54) PAGE REPLACEMENT CODE INJECTION

(71) Applicant: FireEye, Inc., Milpitas, CA (US)

(72) Inventors: Phung-Te Ha, Dublin, CA (US); Seva Tonkonoh, Daly City, CA (US); Osman Abdoul Ismael, Palo Alto, CA (US)

(73) Assignee: FireEye, Inc., Milpitas, CA (US)

( * ) Notice: Subject to any disclaimer, the term of this patent is extended or adjusted under 35 U.S.C. 154(b) by 274 days.

(21) Appl. No.: 14/042,465

(22) Filed: Sep. 30, 2013

(51) Int. Cl.
*G06F 21/00* (2013.01)
*G06F 21/56* (2013.01)

(52) U.S. Cl.
CPC .................................... *G06F 21/56* (2013.01)

(58) Field of Classification Search
CPC ....................................................... G06F 21/56
See application file for complete search history.

(56) References Cited

U.S. PATENT DOCUMENTS

| 4,292,580 | A | 9/1981 | Ott et al. |
| 5,175,732 | A | 12/1992 | Hendel et al. |
| 5,440,723 | A | 8/1995 | Arnold et al. |
| 5,657,473 | A | 8/1997 | Killean et al. |
| 5,842,002 | A | 11/1998 | Schnurer et al. |
| 5,978,917 | A | 11/1999 | Chi |
| 6,088,803 | A | 7/2000 | Tso et al. |
| 6,094,677 | A | 7/2000 | Capek et al. |
| 6,269,330 | B1 | 7/2001 | Cidon et al. |
| 6,279,113 | B1 | 8/2001 | Vaidya |
| 6,298,445 | B1 | 10/2001 | Shostack |
| 6,357,008 | B1 | 3/2002 | Nachenberg |
| 6,424,627 | B1 | 7/2002 | Sorhaug et al. |
| 6,484,315 | B1 | 11/2002 | Ziese |
| 6,487,666 | B1 | 11/2002 | Shanklin et al. |
| 6,493,756 | B1 | 12/2002 | O'Brien et al. |
| 6,550,012 | B1 | 4/2003 | Villa et al. |

(Continued)

FOREIGN PATENT DOCUMENTS

| GB | 2439806 | 1/2008 |
| WO | WO-02/06928 | 1/2002 |

(Continued)

OTHER PUBLICATIONS

*IEEE Xplore Digital Library Sear Results for "detection of unknown computer worms"*. Http//ieeexplore.ieee.org/searchresult.jsp?SortField=Score&SortOrder=desc&ResultC . . . , (Accessed on Aug. 28, 2009).

(Continued)

*Primary Examiner* — Brandon Hoffman
*Assistant Examiner* — Thong Truong
(74) *Attorney, Agent, or Firm* — Rutan & Tucker, LLP

(57) ABSTRACT

Techniques for malicious content detection using code injection are described herein. In one embodiment a first code section of a target program is loaded into a first memory page of a virtual machine (VM) hosted by a virtual machine monitor (VMM). The target program to receive code injection. The VMM injects a second code section into the target program by replacing the first code section with a second code section loaded in a second memory page. Determining a behavior of a content specimen using the injected second code section instead of the first code section, and the second code section is injected after the target program.

23 Claims, 5 Drawing Sheets

(56) References Cited

U.S. PATENT DOCUMENTS

| | | |
|---|---|---|
| 6,775,657 B1 | 8/2004 | Baker |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,981,279 B1 | 12/2005 | Arnold et al. |
| 7,007,107 B1 | 2/2006 | Ivchenko et al. |
| 7,028,179 B1 | 4/2006 | Anderson et al. |
| 7,043,757 B2 | 5/2006 | Hoefelmeyer et al. |
| 7,069,316 B1 | 6/2006 | Gryaznov |
| 7,080,408 B1 | 7/2006 | Pak et al. |
| 7,093,239 B1 | 8/2006 | van der Made |
| 7,100,201 B2 | 8/2006 | Izatt |
| 7,159,149 B2 | 1/2007 | Spiegel et al. |
| 7,231,667 B2 | 6/2007 | Jordan |
| 7,240,364 B1 | 7/2007 | Branscomb et al. |
| 7,240,368 B1 | 7/2007 | Roesch et al. |
| 7,287,278 B2 | 10/2007 | Liang |
| 7,308,716 B2 | 12/2007 | Danford et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,603,715 B2 | 10/2009 | Costa et al. |
| 7,639,714 B2 | 12/2009 | Stolfo et al. |
| 7,644,441 B2 | 1/2010 | Schmid et al. |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,779,463 B2 | 8/2010 | Stolfo et al. |
| 7,784,097 B1 | 8/2010 | Stolfo et al. |
| 7,849,506 B1 | 12/2010 | Dansey et al. |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,937,761 B1 | 5/2011 | Benett |
| 7,996,556 B2 | 8/2011 | Raghavan et al. |
| 7,996,836 B1 | 8/2011 | McCorkendale et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,201,246 B1 | 6/2012 | Wu et al. |
| 8,204,984 B1 | 6/2012 | Aziz et al. |
| 8,220,055 B1 | 7/2012 | Kennedy |
| 8,233,882 B2 | 7/2012 | Rogel |
| 8,234,709 B2 | 7/2012 | Viljoen et al. |
| 8,239,944 B1 | 8/2012 | Nachenberg et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,516,593 B2 | 8/2013 | Aziz |
| 8,528,086 B1 | 9/2013 | Aziz |
| 8,539,582 B1 | 9/2013 | Aziz et al. |
| 8,549,638 B2 | 10/2013 | Aziz |
| 8,561,177 B1 | 10/2013 | Aziz et al. |
| 8,566,946 B1 | 10/2013 | Aziz et al. |
| 8,584,094 B2 | 11/2013 | Dahdia et al. |
| 8,584,239 B2 | 11/2013 | Aziz et al. |
| 8,635,696 B1 | 1/2014 | Aziz |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0144156 A1 | 10/2002 | Copeland, III |
| 2002/0162015 A1 | 10/2002 | Tang |
| 2002/0166063 A1 | 11/2002 | Lachman et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0115483 A1 | 6/2003 | Liang |
| 2003/0188190 A1 | 10/2003 | Aaron et al. |
| 2003/0200460 A1 | 10/2003 | Morota et al. |
| 2003/0212902 A1 | 11/2003 | Van Der Made |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0111531 A1 | 6/2004 | Staniford et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0114663 A1 | 5/2005 | Cornell et al. |
| 2005/0125195 A1 | 6/2005 | Brendel |
| 2005/0157662 A1 | 6/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0265331 A1 | 12/2005 | Stolfo |
| 2006/0010495 A1 | 1/2006 | Cohen et al. |
| 2006/0015715 A1 | 1/2006 | Anderson |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |

(56) References Cited

U.S. PATENT DOCUMENTS

| | | |
|---|---|---|
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0094730 A1 | 4/2007 | Bhikkaji et al. |
| 2007/0143827 A1 | 6/2007 | Nicodemus et al. |
| 2007/0156895 A1 | 7/2007 | Vuong |
| 2007/0157306 A1 | 7/2007 | Elrod et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0271446 A1 | 11/2007 | Nakamura |
| 2008/0005782 A1 | 1/2008 | Aziz |
| 2008/0072326 A1 | 3/2008 | Danford et al. |
| 2008/0080518 A1 | 4/2008 | Hoeflin et al. |
| 2008/0083030 A1* | 4/2008 | Durham et al. ............ 726/22 |
| 2008/0098476 A1 | 4/2008 | Syversen |
| 2008/0120722 A1 | 5/2008 | Sima et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301676 A1* | 12/2008 | Alpern et al. .................. 718/1 |
| 2008/0301810 A1 | 12/2008 | Lehane et al. |
| 2008/0320594 A1 | 12/2008 | Jiang |
| 2009/0007100 A1 | 1/2009 | Field et al. |
| 2009/0013408 A1 | 1/2009 | Schipka |
| 2009/0031423 A1 | 1/2009 | Liu et al. |
| 2009/0044024 A1 | 2/2009 | Oberheide et al. |
| 2009/0044274 A1 | 2/2009 | Budko et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0133125 A1 | 5/2009 | Choi et al. |
| 2009/0193293 A1 | 7/2009 | Stolfo et al. |
| 2009/0228233 A1 | 9/2009 | Anderson et al. |
| 2009/0241190 A1 | 9/2009 | Todd et al. |
| 2009/0271867 A1 | 10/2009 | Zhang |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0017546 A1 | 1/2010 | Poo et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0192223 A1 | 7/2010 | Ismael et al. |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2011/0041179 A1* | 2/2011 | St Hlberg ............ G06F 21/566 726/23 |
| 2011/0047620 A1 | 2/2011 | Mahaffey et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0113231 A1 | 5/2011 | Kaminsky |
| 2011/0247072 A1 | 10/2011 | Staniford et al. |
| 2011/0265182 A1 | 10/2011 | Peinado et al. |
| 2011/0307955 A1 | 12/2011 | Kaplan et al. |
| 2011/0314546 A1 | 12/2011 | Aziz et al. |
| 2012/0079596 A1 | 3/2012 | Thomas et al. |
| 2012/0084859 A1 | 4/2012 | Radinsky et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0210423 A1 | 8/2012 | Friedrichs et al. |
| 2012/0222121 A1 | 8/2012 | Staniford et al. |
| 2013/0036472 A1 | 2/2013 | Aziz |
| 2013/0227691 A1 | 8/2013 | Aziz et al. |
| 2013/0291109 A1 | 10/2013 | Staniford et al. |
| 2013/0318610 A1* | 11/2013 | Zaitsev ................. G06F 21/56 726/24 |

FOREIGN PATENT DOCUMENTS

| | | |
|---|---|---|
| WO | WO-02/23805 | 3/2002 |
| WO | WO-2008/041950 | 4/2008 |
| WO | WO-2012/145066 | 10/2012 |

OTHER PUBLICATIONS

*AltaVista Advanced Search Results.* "*Event Orchestrator*". Http://www.altavista.com/web/results?Itag=ody&pg=aq&aqmode=aqa=Event+Orchesrator . . . , (Accessed on Sep. 3, 2009).
*AltaVista Advanced Search Results.* "*attack vector identifier*". Http://www.altavista.com/web/results?Itag=ody&pg=aq&aqmode=aqa=Event+Orchestrator . . . , (Accessed on Sep. 15, 2009).
International Search Report and Written Opinion of the International Searching Authority dated May 10, 2012; International Application No. PCT/US 12/21916.
International Search Report and Written Opinion of the International Searching Authority dated May 25, 2012; International Application No. PCT/US 12/26402.
Cisco, Configuring the Catalyst Switched Port Analyzer (SPAN) ("Cisco"), (*1992-2003, Cisco Systems*).
Reiner Sailer, Enriquillo Valdez, Trent Jaeger, Roonald Perez, Leendert van Doorn, John Linwood Griffin, Stefan Berger., *sHype: Secure Hypervisor Approach to Trusted Virtualized Systems* (Feb. 2, 2005) ("Sailer").
Excerpt regarding First Printing Date for Merike Kaeo, *Designing Network Security* ("Kaeo"), (Copyright 2005).
*The Sniffers's Guide to Raw Traffic* available at: yuba.stanford.edu/~casado/pcap/section1.html, (Jan. 6, 2014).
"Network Security: NetDetector—Network Intrusion Forensic System (NIFS) Whitepaper", ("*NetDetector Whitepaper*"), (Copyright 2003).
"Packet", *Microsoft Computer Dictionary, Microsoft Press*, (Mar. 2002), 1 page.
"When Virtual is Better Than Real", *IEEEXplore Digital Library*, available at, http://ieeexplore.ieee.org/xpl/articleDetails.jsp?reload=true&arnumber=990073, (Dec. 7, 2013).
Adetoye, Adedayo , et al., "Network Intrusion Detection & Response System", ("Adetoye"), (Sep. 2003).
Baecher, "The Nepenthes Platform: An Efficient Approach to collect Malware", *Springer-verlag Berlin Heidelberg*, (2006), pp. 165-184.
Bayer, et al., "Dynamic Analysis of Malicious Code", *J Comput Virol*, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", *International Conference on Emerging Networking Experiments and Technologies, Proceedings of the 2005 ACM Conference on Emerging Network Experiment and Technology*, CoNEXT '05, Toulousse, France, (Oct. 2005), pp. 71-82.
Cohen, M.I. , "PyFlag—An advanced network forensic framework", *Digital investigation 5*, ELSEVIER, (2008), pp. S112-S120.

(56) References Cited

OTHER PUBLICATIONS

Costa, M., et al., "Vigilante: End-to-End Containment of Internet Worms", *SOSP '05, Association for Computing Machinery, Inc.*, Brighton U.K., (Oct. 23-26, 2005).

Crandall, J.R., et al., "Minos:Control Data Attack Prevention Orthogonal to Memory Model", *37th International Symposium on Microarchitecture*, Portland, Oregon, (Dec. 2004).

Distler, "Malware Analysis: An Introduction", *SANS Institute InfoSec Reading Room*, SANS Institute, (2007).

Dunlap, George W., et al., "ReVirt: Enabling Intrusion Analysis through Virtual-Machine Logging and Replay", *Proceeding of the 5th Symposium on Operating Systems Design and Implementation, USENIX Association*, ("Dunlap"), (Dec. 9, 2002).

Hjelmvik, Erik, "Passive Network Security Analysis with NetworkMiner", *(IN)SECURE*, Issue 18, (Oct. 2008), pp. 1-100.

Kaeo, Merike, "Designing Network Security", ("Kaeo"), (Nov. 2003).

Kim, H., et al., "Autograph: Toward Automated, Distributed Worm Signature Detection", *Proceedings of the 13th Usenix Security Symposium (Security 2004)*, San Diego, (Aug. 2004), pp. 271-286.

King, Samuel T., et al., "Operating System Support for Virtual Machines", ("King").

Krasnyansky, Max, et al., *Universal TUN/TAP driver*, available at https://www.kernel.org/doc/Documentation/networking/tuntap.txt (2002) ("Krasnyansky").

Kreibich, C., et al., "Honeycomb-Creating Intrusion Detection Signatures Using Honeypots", *2nd Workshop on Hot Topics in Networks (HotNets-11)*, Boston, USA, (2003).

Kristoff, J., "Botnets, Detection and Mitigation: DNS-Based Techniques", *NUSecurity Day*, (2005), 23 pages.

Liljenstam, Michael, et al., "Simulating Realistic Network Traffic for Worm Warning System Design and Testing", *Institute for Security Technology studies, Dartmouth College*, ("Liljenstam"), (Oct. 27, 2003).

Marchette, David J., "Computer Intrusion Detection and Network Monitoring: A Statistical Viewpoint", ("Marchette"), (2001).

Margolis, P.E., "Random House Webster's 'Computer & Internet Dictionary 3rd Edition'", ISBN 0375703519, (Dec. 1998).

Moore, D., et al., "Internet Quarantine: Requirements for Containing Self-Propagating Code", *INFOCOM*, vol. 3, (Mar. 30-Apr. 3, 2003), pp. 1901-1910.

Natvig, Kurt, "SANDBOXII: Internet", *Virus Bulletin Conference*, ("Natvig"), (Sep. 2002).

Newsome, J., et al., "Dynamic Taint Analysis for Automatic Detection, Analysis, and Signature Generation of Exploits on Commodity Software", *In Proceedings of the 12th Annual Network and Distributed System Security, Symposium (NDSS '05)*, (Feb. 2005).

Newsome, J., et al., "Polygraph: Automatically Generating Signatures for Polymorphic Worms", *In Proceedings of the IEEE Symposium on Security and Privacy*, (May 2005).

Nojiri, D., et al., "Cooperation Response Strategies for Large Scale Attack Mitigation", *DARPA Information Survivability Conference and Exposition*, vol. 1, (Apr. 22-24, 2003), pp. 293-302.

Peter M. Chen, and Brian D. Noble, "When Virtual Is Better Than Real, Department of Electrical Engineering and Computer Science", *University of Michigan* ("Chen").

Silicon Defense, "Worm Containment in the Internal Network", (Mar. 2003), pp. 1-25.

Singh, S., et al., "Automated Worm Fingerprinting", *Proceedings of the ACM/USENIX Symposium on Operating System Design and Implementation*, San Francisco, California, (Dec. 2004).

Spitzner, Lance, "Honeypots: Tracking Hackers", ("Spizner"), (Sep. 17, 2002).

Thomas H. Ptacek, and Timothy N. Newsham, "Insertion, Evasion, and Denial of Service: Eluding Network Intrusion Detection", *Secure Networks*, ("Ptacek"), (Jan. 1998).

Venezia, Paul, "NetDetector Captures Intrusions", *InfoWorld Issue 27*, ("Venezia"), (Jul. 14, 2003).

Whyte, et al., "DNS-Based Detection of Scanning Works in an Enterprise Network", *Proceedings of the 12th Annual Network and Distributed System Security Symposium*, (Feb. 2005), 15 pages.

Williamson, Matthew M., "Throttling Viruses: Restricting Propagation to Defeat Malicious Mobile Code", *ACSAC Conference*, Las Vegas, NV, USA, (Dec. 2002), pp. 1-9.

\* cited by examiner

PAGE REPLACEMENT CODE INJECTION

FIELD OF THE INVENTION

Embodiments of the present invention relate generally to malware detection. More particularly, embodiments of the invention relate to page replacement code injection to enable efficient detection and neutralization of malware.

BACKGROUND

Malicious software, or malware for short, may include any program or file that is harmful by design to a computer. Malware includes computer viruses, worms, Trojan horses, adware, spyware, and any programming that gathers information about a computer or its user or otherwise operates without permission. The owners of the computers are often unaware that these programs have been added to their computers and are often similarly unaware of their function.

Malicious network content is a type of malware distributed over a network via websites, e.g., servers operating on a network according to a hypertext transfer protocol (HTTP) standard or other well-known standard. Malicious network content distributed in this manner may be actively downloaded and installed on a computer, without the approval or knowledge of its user, simply by the computer accessing the web site hosting the malicious network content (the "malicious web site"). Malicious network content may be embedded within objects associated with web pages hosted by the malicious web site. Malicious network content may also enter a computer on receipt or opening of email. For example, email may contain an attachment, such as a PDF document, with embedded malicious executable programs. Furthermore, malicious content may exist in files contained in a computer memory or storage device, having infected those files through any of a variety of attack vectors.

Various processes and devices have been employed to prevent the problems associated with malicious content. For example, computers often run antivirus scanning software that scans a particular computer for viruses and other forms of malware. The scanning typically involves automatic detection of a match between content stored on the computer (or attached media) and a library or database of signatures of known malware. The scanning may be initiated manually or based on a schedule specified by a user or system administrator associated with the particular computer. Unfortunately, by the time malware is detected by the scanning software, some damage on the computer or loss of privacy may have already occurred, and the malware may have propagated from the infected computer to other computers. Additionally, it may take days or weeks for new signatures to be manually created, the scanning signature library updated and received for use by the scanning software, and the new signatures employed in new scans.

Moreover, anti-virus scanning utilities may have limited effectiveness to protect against all exploits by polymorphic malware. Polymorphic malware has the capability to mutate to defeat the signature match process while keeping its original malicious capabilities intact. Signatures generated to identify one form of a polymorphic virus may not match against a mutated form. Thus polymorphic malware is often referred to as a family of virus rather than a single virus, and improved anti-virus techniques to identify such malware families is desirable.

Another type of malware detection solution employs virtual environments to process content within a sandbox established by virtual machines (VMs). Such solutions monitor the behavior of content during execution to detect anomalies that may signal the presence of malware. One such system offered by FireEye, Inc., the assignee of the present patent application, employs a two-phase malware detection approach to detect malware contained in network traffic monitored in real-time. In a first or "static" phase, a heuristic is applied to network traffic to identify and filter packets that appear suspicious in that they exhibit characteristics associated with malware. In a second or "dynamic" phase, the suspicious packets (and typically only the suspicious packets) are executed or otherwise processed within one or more virtual machines.

A sandbox installation (e.g., a virtual disk or image that may include the malware detection program, the host operating system, and the host virtual machine) traditionally relies upon replacement of entire sandbox installation at a client location to update any portion of the environment (e.g., a behavior monitor or target program). To update the entire sandbox install can require re-sending the entire sandbox installation via a network connection, which may create unnecessary delays and require network resources.

Unfortunately, malware may be able to detect malware detection mechanisms within virtual environments. In some cases, malware may be able to determine whether it is actively being monitored within a sandbox environment. Improvements towards efficient updating of sandbox installations as well as mechanisms for effectively thwarting malware detection of monitoring systems are needed.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
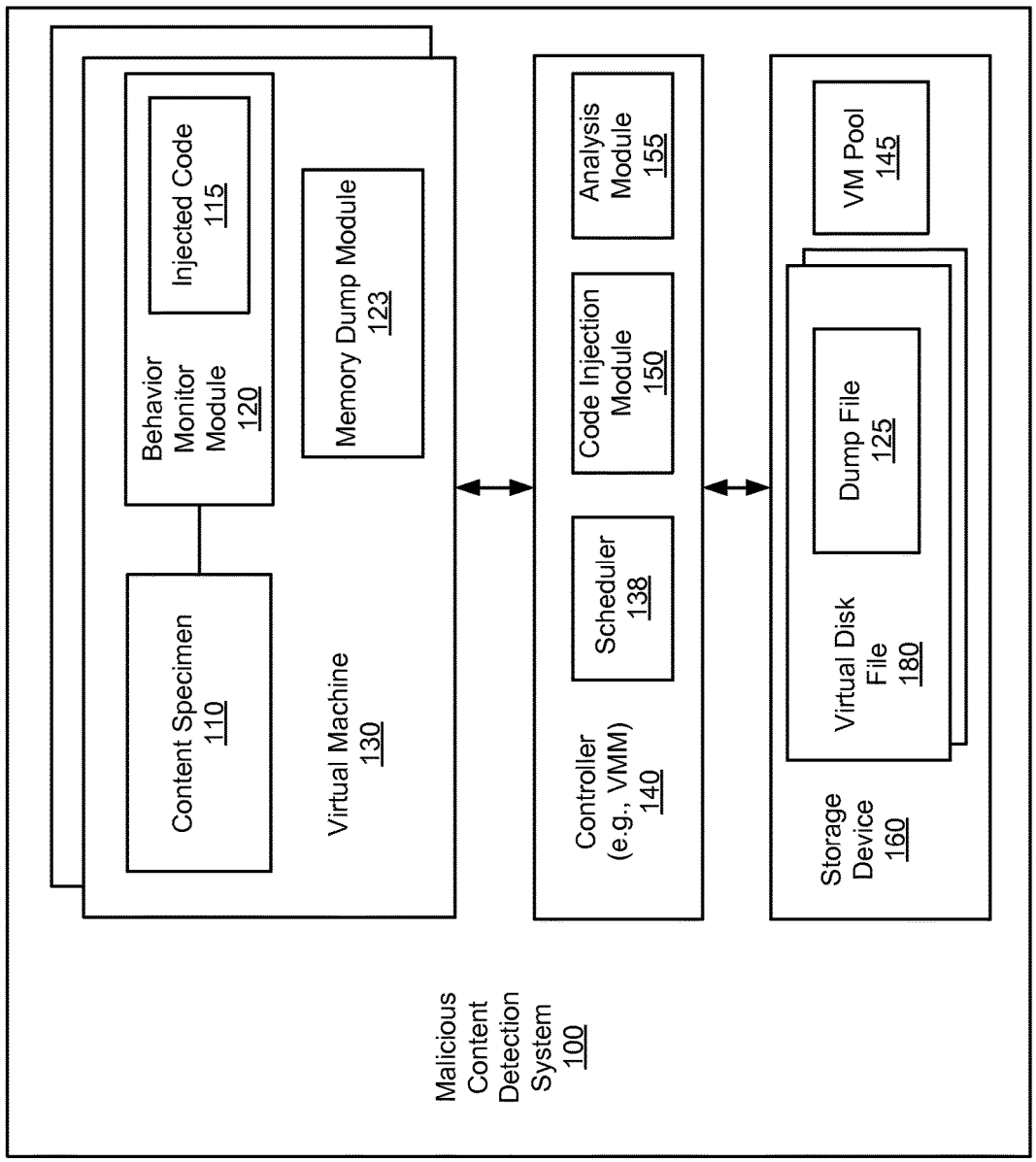
FIG. 1 is a block diagram illustrating a page replacement code injection system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Techniques for page replacement code injection are described herein. According to one embodiment, a virtual disk image in a malicious content detection environment may be updated on the fly without having to replace the entire virtual disk. The virtual disk image may be updated by injecting code into a target program initialized in the virtual disk image. The target program may be any type of program to take advantage of code injection as described herein. In an illustrated example, the target program may be a Behavior Monitoring Module (BMM) or an empty shell program containing at least the ability to read data units from VM memory (e.g., capable of reading memory pages and swapping out subroutines). The target program can trigger dynamic code injection from a controller hosting the virtual machine. In one embodiment, a code injection module within the controller replaces a memory address corresponding to an original memory location with a target memory address corresponding to the target memory location (injected code). Advantageously, in response to code injection, the target program (and the virtual disk) can receive additional, new, or updated features or functionality without having to replace the entire virtual disk. Additionally, because the code injection may occur after target program initialization, or at a specified time, the injected code may be obscured from detection by malware in the malicious content detection environment.

I. Terminology

In the following description, certain terminology is used to describe features of the invention. For example, in certain situations, terms "module," "logic," and "engine" are representative of hardware, firmware and/or software that is configured to perform one or more functions. As hardware, module (logic, or engine) may include hardware circuitry having data processing or storage functionality. Examples of such circuitry may include, but is not limited or restricted to a microprocessor, one or more processor cores, a programmable gate array, a microcontroller, an application specific integrated circuit, a digital signal processor, semiconductor memory, combinatorial logic, or the like.

Module (logic, or engine) may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "content specimen" may include one or more types of data such as text, software, images, audio, metadata and/or other digital data. One example of content may include web content, or any data traffic that may be transmitted using a Hypertext Transfer Protocol (HTTP), Hypertext Markup Language (HTML) protocol, or may be transmitted in a manner suitable for display on a Web browser software application. Content may also refer to information transmitted as one or more messages, where each message may be in the form of a packet, a frame, an Asynchronous Transfer Mode "ATM" cell, or any other series of bits having a prescribed format. The content may be received as a data flow, namely a group of related messages, within ingress network traffic.

Another example of content includes electronic mail (email), which may be transmitted using an email protocol such as Simple Mail Transfer Protocol (SMTP), Post Office Protocol version 3 (POP3), or Internet Message Access Protocol (IMAP4). A further example of content includes an Instant Message, which may be transmitted using Session Initiation Protocol (SIP) or Extensible Messaging and Presence Protocol (XMPP) for example. Yet another example of content includes one or more files that are transferred using a data transfer protocol such as File Transfer Protocol (FTP) for subsequent storage on a file share, or one or more files that are stored on a file share, storage server, storage device, or the like ("data at rest").

The term "malware" is directed to software that produces an undesired behavior upon execution, where the behavior is deemed to be "undesired" based on customer-specific rules, manufacturer-based rules, and any other type of rules formulated by public opinion or a particular governmental or commercial entity. This undesired behavior may include a communication-based anomaly or an execution-based anomaly that would (1) alter the functionality of an electronic device executing an application software in a malicious manner; (2) alter the functionality of an electronic device executing that application software without any malicious intent; and/or (3) provide an unwanted functionality which is generally acceptable in other context.

In general, a "virtual machine" (VM) is a simulation of an electronic device (abstract or real) that is usually different from the electronic device conducting the simulation. A VM may include one or more VM processes where each VM process is based on specifications of a hypothetical electronic component (e.g., processor, network interface card "NIC"; storage device, etc.) so as to collectively emulate the architecture and functions of a real electronic device. For simplicity, a "virtual device" may be a virtualization of an electronic device or an electronic component.

"VM instrumentation" refers to a software module configured for execution on a virtual machine (VM), where the software module controls and/or monitors virtualized operations conducted on an object associated with network traffic. These virtualized operations, which are representative of operations conducted by the virtual device, produce or lead to information from which behaviors may be determined. The detection of anomalous behaviors represent that the object is suspicious and may include malware. An assigned level of suspiciousness may be used to identify the likelihood that the object includes malware.

II. Exemplary Illustration of a Page Replacement Code Injection System

FIG. 1 is a block diagram illustrating a page replacement code injection system according to one embodiment of the invention. Referring to FIG. 1, system 100 includes controller 140 to manage or control one or more virtual machines (VMs) 130 (also referred to as a sandboxed operating environment or simply a sandbox). Content associated with VMs 130 are stored in virtual disk(s) as part of a VM disk file 180 and may be loaded into the virtual machine, which may be executed in a memory region that has been allocated to the VM (also referred to as a virtual memory) from the physical memory of the system 100. Similarly, virtual disk file 180 may be allocated from the physical storage space of storage device for each of the VMs 130, where each VM has its own allocated virtual memory region.

The virtual disk may be a compressed disk in a production environment. To update the virtual disk in a production environment without code injection, a new virtual disk replaces the entire virtual disk with appropriate code changes in place before the disk swap occurs. An advantage of code injection as described herein, is to allow a production environment to benefit from live updates (e.g., without shutting down the VM and swapping out an entirely new image) of the compressed virtual disk even when the VM is running or is in-between states, such as a partially booted state. In one embodiment, injected code can provide on the fly updates to the virtual disk and sandboxed environment in response to a new malware threat recently detected (e.g., not previously covered in a current sandbox installation).

Content specimen 110 may be pre-installed into a sandbox or may be received at some time during or after sandbox initialization. In some embodiments, BMM may be initialized before, after, or at the same time content specimen 110 is received in the sandbox. For example, BMM (e.g., BMM 120) may be running within VM 130, which may be scheduled and launched by scheduler 138 from VM pool 145. In some embodiments, scheduler 138 may initiate receipt of the content specimen (e.g., from a network connection or from a device) at a designated moment in time.

In one embodiment, BMM 120 (e.g., target program) is a software program initialized within the sandbox to receive new, additional, or updated code to provide one or more functions or features (e.g., behavior monitoring features). For example, new or additional behavior monitoring code may be injected into the BMM to provide new or additional monitoring capabilities. In one embodiment, BMM initializes as an empty or reduced functionality shell program (e.g., a program with at least the capability of reading a memory page or other data unit from memory). Initialization as an empty shell program obscures behavior monitoring capability from advanced malware able to detect behavior monitoring. Malware may be unable to determine detection, monitor, or analysis code or functions executing within a target program (e.g., empty shell program) because no behavior monitoring code is initialized in the target program. Therefore, while the target program is initialized within the sandboxed environment and waiting for code injection, advanced malware may not be able to determine any ultimate purpose or function of the target program. In one embodiment, the controller can immediately remove code injected into the BMM to further obscure injected code from malware. In other embodiments, the sandbox can prevent malware (e.g., a content specimen) from being read or executed until injected code has fully executed and is removed from memory. For example, the controller can execute code injection threads while pausing other threads. Because the controller may intercept all system calls, the controller can control which threads are executed and at what time.

In some embodiments, the target program may be a flexible and configurable platform for injecting a variety of types of code and functions into the sandbox, beyond what is described above. For example, the target program may receive code to revise software profiles (e.g., inserting a modified, new, or additional plugin into the sandbox to process specific content). In another example, the target program may receive code to change an initial or resumed application state in the sandbox. In yet another example, the target program may receive code to change a monitoring function running outside sandbox, for example, in the controller 140, in order to monitor operations initiated within the sandbox.

In one embodiment, code injected into the BMM may invoke a memory dump (e.g., memory dump module 123) to capture various information associated with content specimen 110. For example, the memory dump can capture information related to a program used in processing or reading a content specimen 110 such as a word processing program to read a document or a PDF reader to read a PDF document. If the content specimen is an executable file, the injected code may perform a memory dump of the content specimen. The code injected into the BMM can invoke memory dump module by launching memory dump module 123 and passing a process identifier (ID) of content specimen 110 or program associated with the content specimen 110 as a parameter to memory dump module 123.

Memory dumps (e.g., memory dump file 125) may be stored within the associated VM disk file 180 on storage device 160. Memory dumps may include the code image of the content specimen, content of a memory region that has been allocated by the content specimen (e.g., heaps, threads, context), data accessed by the content specimen, embedded content extracted or downloaded during the execution such as a file or another executable binary, as well as information identifying certain activities performed by the content specimen. Memory dumps can be analyzed (e.g., by the controller 140, within VM 130, or sent to a remote server) to determine whether the content specimen is malicious, verify a previous classification of maliciousness, and/or gather additional analytical information about the malware. Unexpected or anomalous behavior can be used in classifying the specimen as malware, and together with the context and state can be used to generate an identifier for the malware. The identifier, or parts thereof, can be used as a malware signature in blocking other malware-containing content.

In one embodiment, code injection module 150 can determine BMM status and inject code based on the determined status. For example, in response to BMM finding behavior of an input content specimen matching behavior of a first type of malware, a corresponding first code section (e.g., directed towards the first type of malware exploit) may be injected. Alternatively, if BMM determines the input content specimen has behavior indicating a second type of malware, the code injection module 150 can inject a corresponding second code section instead. In other embodiments, a variety of malware monitoring functions or features may be performed, each having different injected of code. Advantageously, code injection enables the system to gather additional analytical information about the behavior of the malware, for use in forensics and signature generation, for example.

In one embodiment, BMM may wait for a command from code injection module 150 or controller 140, indicating whether module 120 can continue from an idle or wait state. For example, in response to being initialized (e.g., loaded into the sandbox) BMM may suspend further execution of new or additional code (e.g., injected code) and wait for a command from code injection module 150 or controller 140, indicating whether module 120 can continue. For example, BMM may suspend its operations and periodically or aperiodically check whether a command has been received from controller 140 or code injection 150. When module 120 has been suspended, code injection module 150 may inject the new code in the execution pipeline of the module 120. Once the code has been injected, code injection module 150 or controller 140 may inform BMM that the execution of the BMM may continue. For example, BMM may wait for a value of a predetermined variable or memory location to change from a first state to a second state. Once the code has been injected, code injection module 150 or controller 140 may modify the predetermined variable or memory location from the first state to the second state, such that BMM can continue. In one embodiment, in response to a predetermined event (e.g., file creation, registry access, DLL loading, process execution, power management such as sleep) triggered by content specimen 110, BMM can send a message describing the event(s) via a communication channel to controller 140.

Controller 140 may implement a VM monitor or manager (VMM), also referred to as a hypervisor for monitoring or managing VMs, which may be hosted by a host operating system (OS). VM 130 support execution of a guest OS. The host OS and the guest OS may be the same type of operating systems or different types of operating systems (e.g., Windows™, Linux™, Unix™, Mac OS™, iOS™, etc.) or different versions thereof. In one embodiment, controller 140 has access to identification properties of BMM. For example, controller 140 can determine the process name, state, and memory mapping associated with BMM. Controller 140 also has knowledge of the guest OS of virtual machine 130 and can use knowledge of BMM and the guest OS to find a process identifier associated with the BMM running inside virtual machine 130. In one embodiment, controller 140 tracks one or more states of the BMM to determine when to perform the code injection. Controller 140 can include a code injection module 150 to use memory mapping from the virtual memory associated with VM 130 to the physical memory to inject code for the BMM. For example, controller 140 can replace an original physical memory address corresponding to the memory location of an original virtual memory page with a different physical memory address corresponding to the same virtual memory page, such that a different code section is executed instead of an original code section.

Some malware may be able to detect certain behavior monitoring functions or features within the sandbox. Therefore, to obscure the behavior monitoring from detection by malware, some embodiments may monitor content behavior from outside of the sandboxed environment (e.g., from the controller, VMM, or hypervisor). For example, some or all of the monitoring functionality may be executed by controller 140 instead of or in addition to within virtual machine 130. For example, one or more functions or features of the BMM as described herein may be integrated directly into controller 140. When one or more monitoring features are available outside of the sandbox, a target program (e.g., BMM) may still accept code injection (e.g., a narrowly focused code injection such as a memory dump initialization) to add additional or different monitoring functionality directly into the sandbox.

III. Exemplary Embodiment of Page Replacement Code Injection

Figure 2:
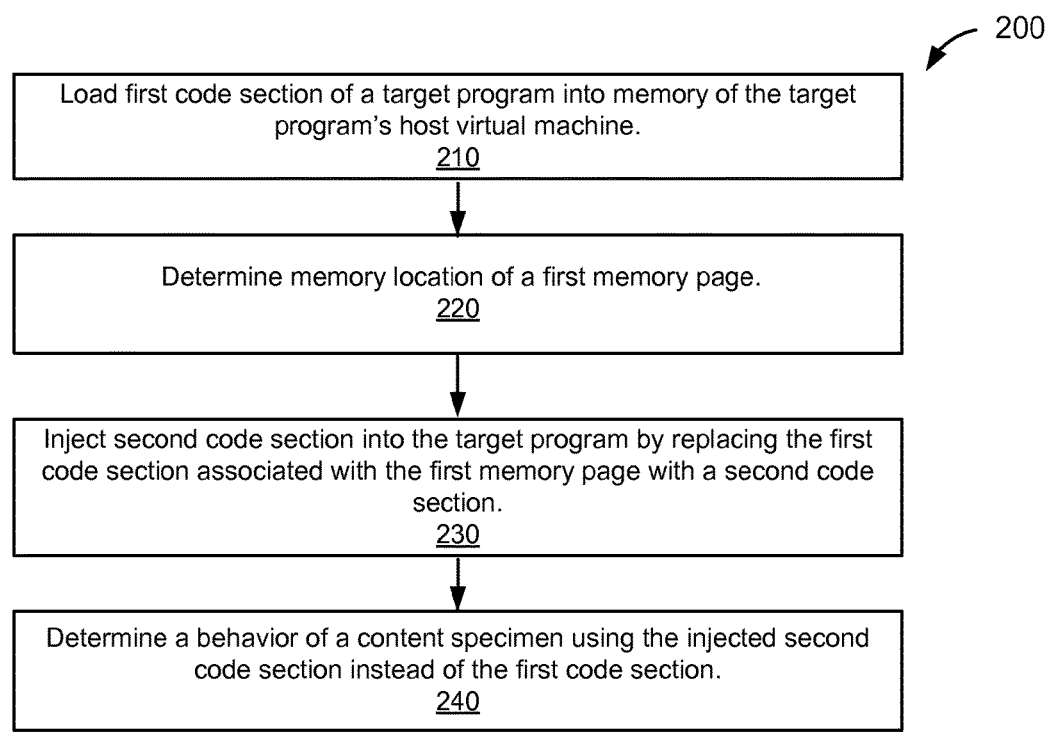
FIG. 2 is a flow diagram illustrating a method for code injection according to one embodiment of the invention.

FIG. 2 is a flow diagram illustrating a method for code injection according to one embodiment of the invention. Method 200 may be performed by system 100 of FIG. 1 described in detail above, which may be implemented as processing logic in software, hardware, or a combination of both. Referring to FIG. 2, at block 210, processing logic (e.g., a code injection module within the VMM) loads a first code section of a target program (e.g., BMM) into memory of the target program's host VM. For example, during the execution of content specimen 110, a first code section of a target program is loaded into a first memory area, region, or page of a virtual machine (e.g., virtual machine 130) hosted by a virtual machine monitor (e.g., controller 140). The target program (e.g., BMM) is a program to monitor and detect whether an input content specimen within the VM is malware. In one embodiment, the target program may be an empty shell program to initialize with a wait status (e.g., an injection ready status). For example, the target program may contain code "while (obj==0);" to wait for an object variable to be filled by the code injection module 150.

In one embodiment, in response to a predetermined event (e.g., file creation, registry access, DLL loading, process execution, power management such as sleep) triggered by content specimen 110, BMM can send a message describing the event(s) and provides additional contextual information via a communication channel to controller 140. Because the code injection module 150 can follow the status of the target program (e.g., tracking when the target program initializes to a waiting state until a specific object variable is filled), injection can begin in response to loading the target program into virtual memory. Controller 140 may also have access to one or more target program identifiers (e.g., target program process identifier) or hooks to find the target program process within the sandbox.

At block 220, the processing logic determines the memory location of the first memory page. The processing logic (e.g., code injection module 150, or other VMM process) can read from a configuration file to determine the location of a first memory address of the first memory page. In one embodiment, the memory location is an address reserved in response to creating an executable of the target program.

At block 230, the processing logic injects a second code section into the target program by replacing the first code section with a second code section loaded in a second memory page. The VMM can replace a first memory address corresponding to the memory location of the first memory page with a second memory page, such that the second code section is executed instead of the first code section. Code injection module 150 may use predetermined code and data stored in persistent memory and ready for injection into the virtual machine (e.g., BMM at the predetermined memory location). Alternatively, code injection module 150 can create code and data for insertion on the fly based on a current status or property of BMM. For example, BMM may run a number of distinct monitoring tests, each test yielding different results (e.g., positive confirmation of malware, negative confirmation of malware, or other variation). In response to the different test results, the code injection module 150 can dynamically adjust what code and data will be injected, and iteratively inject different code functionality into the BMM.

At block 240, the processing logic determines a behavior of an input content specimen using the injected second code section instead of the first code section. In one embodiment, the first code section is related to malware detection and the second code section is related to malware analysis. For example, the second code section can initiate a "memory dump" to include any information in a memory of the VM associated with the content specimen during the execution of the content specimen.

IV. Exemplary Illustration of Code Injection with Memory Swapping

Figure 3A:
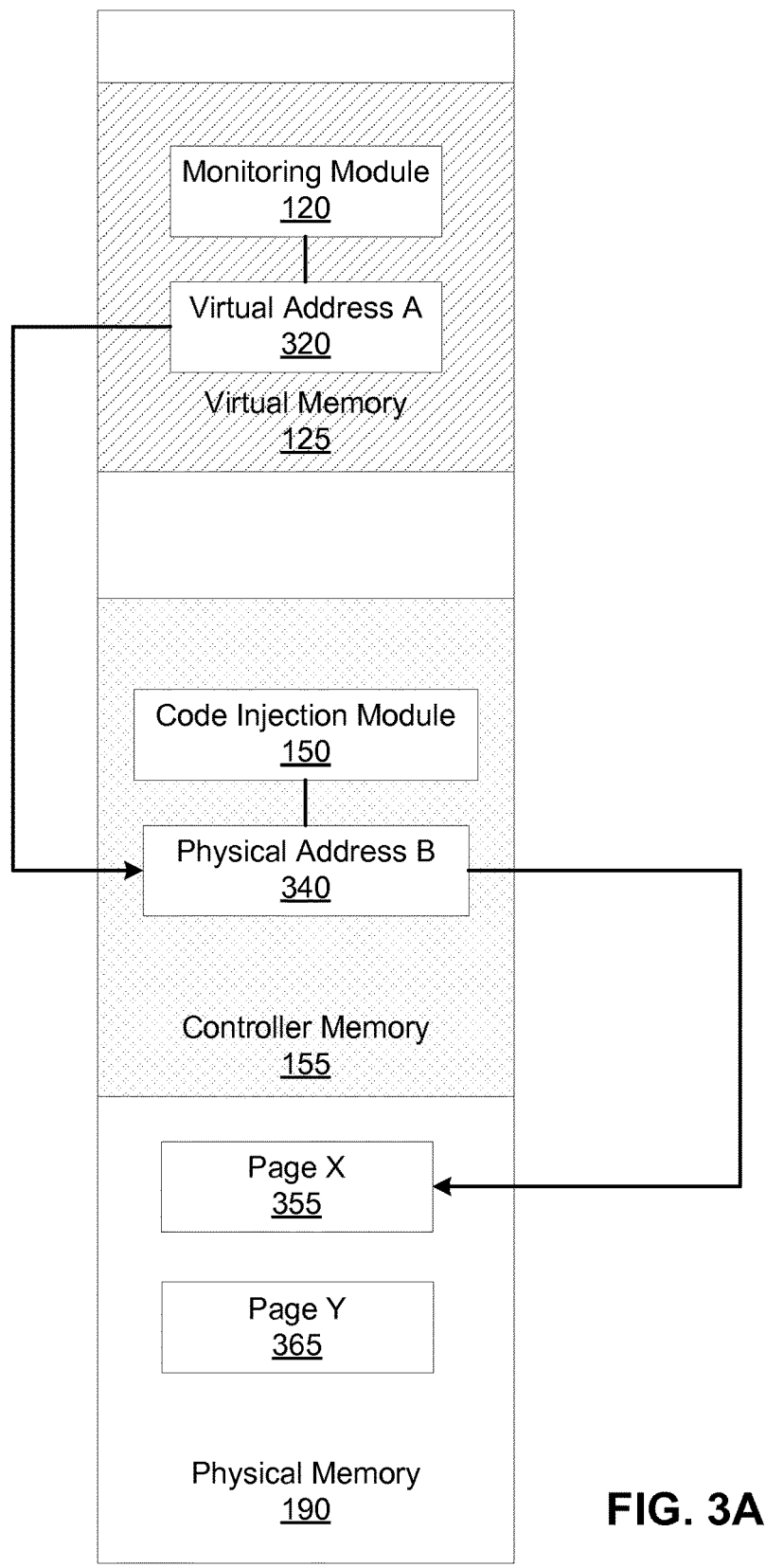
FIGS. 3A and 3B are a block diagrams illustrating physical memory of a host machine before and after code replacement according to one embodiment of the invention.
Figure 3B:
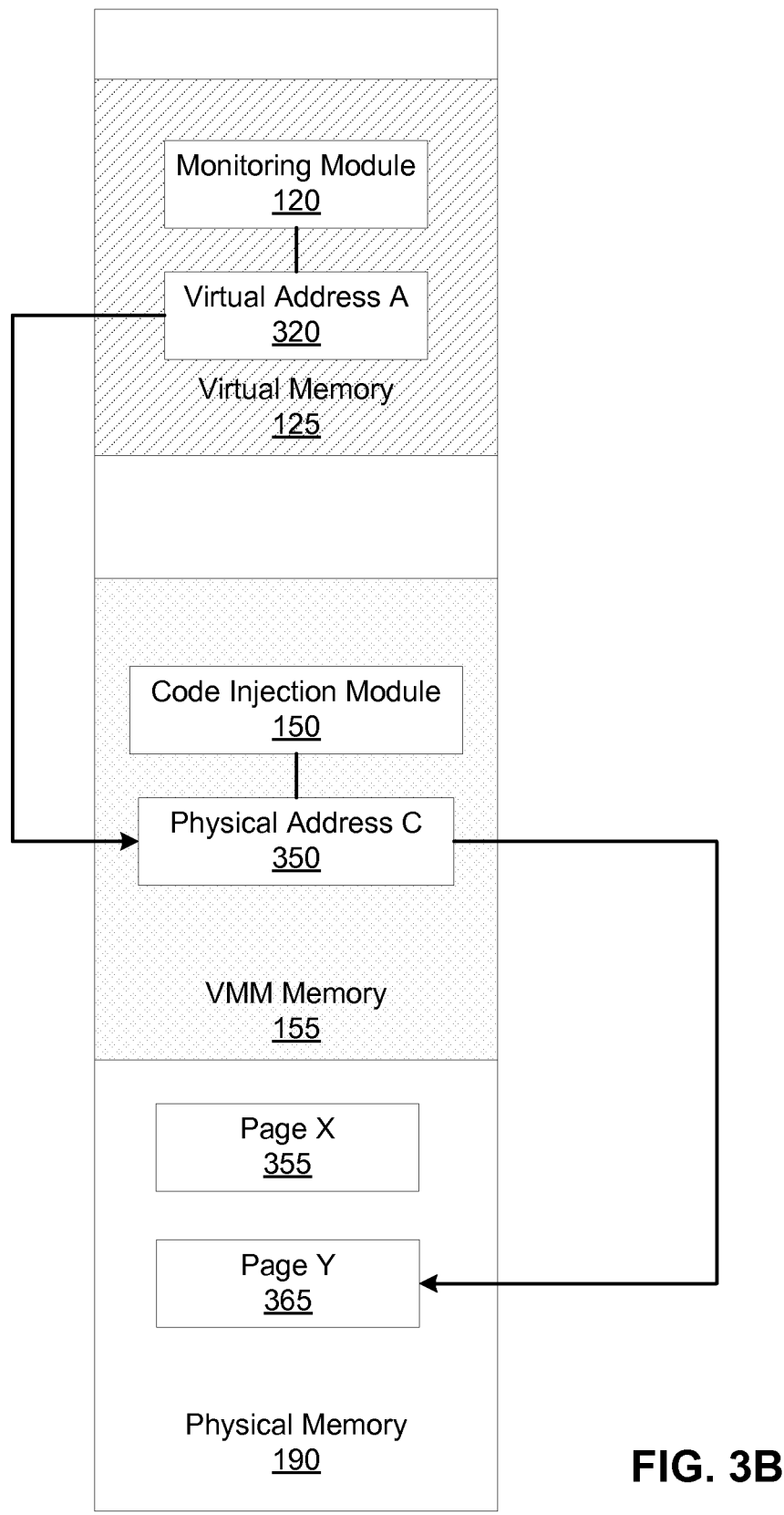

FIGS. 3A and 3B are block diagrams illustrating physical memory of a host machine before and after code replacement according to one embodiment of the invention. FIG. 3A illustrates memory usage of BMM at a first point in time before code injection. As illustrated, BMM is loaded into the virtual memory associated with a virtual machine and has code and data (e.g., page X 355) referenced by virtual address A 320 (also referred to as a linear memory address). Virtual address A 320 is a virtual memory mapping of physical address B 340 stored by controller 140 (e.g., VMM or hypervisor) in a memory region, also referred to as controller memory, associated with controller 140 (e.g., hypervisor shadow memory). Virtual address A 320 is translated by controller 140 into physical address B 340 within controller memory. Controller memory references actual pages within physical memory 190. For example, physical memory 190 contains actual page X 355 at physical address B 340.

FIG. 3B illustrates memory usage of BMM at a second point in time after code injection. In response to determining BMM is ready for code injection, controller 140 (e.g., via code injection module 150) injects code and data by changing the physical address B 340 referencing page X 355 to physical address C 350 referencing page Y 365. Illustratively, the virtual address A 320 does not change in response to injection of the new or updated memory page (page Y 365). Page Y 365 may include code and data for performing malware analysis.

In one embodiment, when BMM is compiled, a compiler or linker reserves the virtual address range in the BMM's executable image file. For example a compiler can create a zero-filled code section in a BMM program or executable. In one embodiment, the reserved address range is stored in a configuration file, which is read by code injection module 150 at runtime. Code injection module 150 uses the memory address range of the BMM to inject new code (e.g., inject a new or updated code segment). For example, code injection module 150 may load a second code segment into the memory (e.g., different memory location or area) associated with VM 130. The first memory address (e.g., a first starting address in a range) of the first code segment is replaced by a second memory address (e.g., a second starting address in a range) of the second code segment, such that when the execution of the program, in this example BMM, continues, the second code segment will be executed instead of the first code segment. The second code section serves to control or direct monitoring of the run-time environment so as to detect the predetermined events described above.

In some embodiments, controller 140 (e.g., VMM or hypervisor) receives the code section from a remote facility (e.g., server 410 described below) over a network (e.g., network 430). Controller 140 may receive the code section after the target program (e.g., BMM or VM instrumentation) has been received by a data processing system (e.g., malicious content detection system 100) in which the host VM and the host VMM are executed. In other embodiments, new or updated code and data may be generated on the fly at controller 140 instead of being sent across a network connection. For example, to avoid network snooping by a malware program, direct code injection from controller 140 can negate any reliance on network communication to update the sandbox.

V. General Architecture

Figure 4:
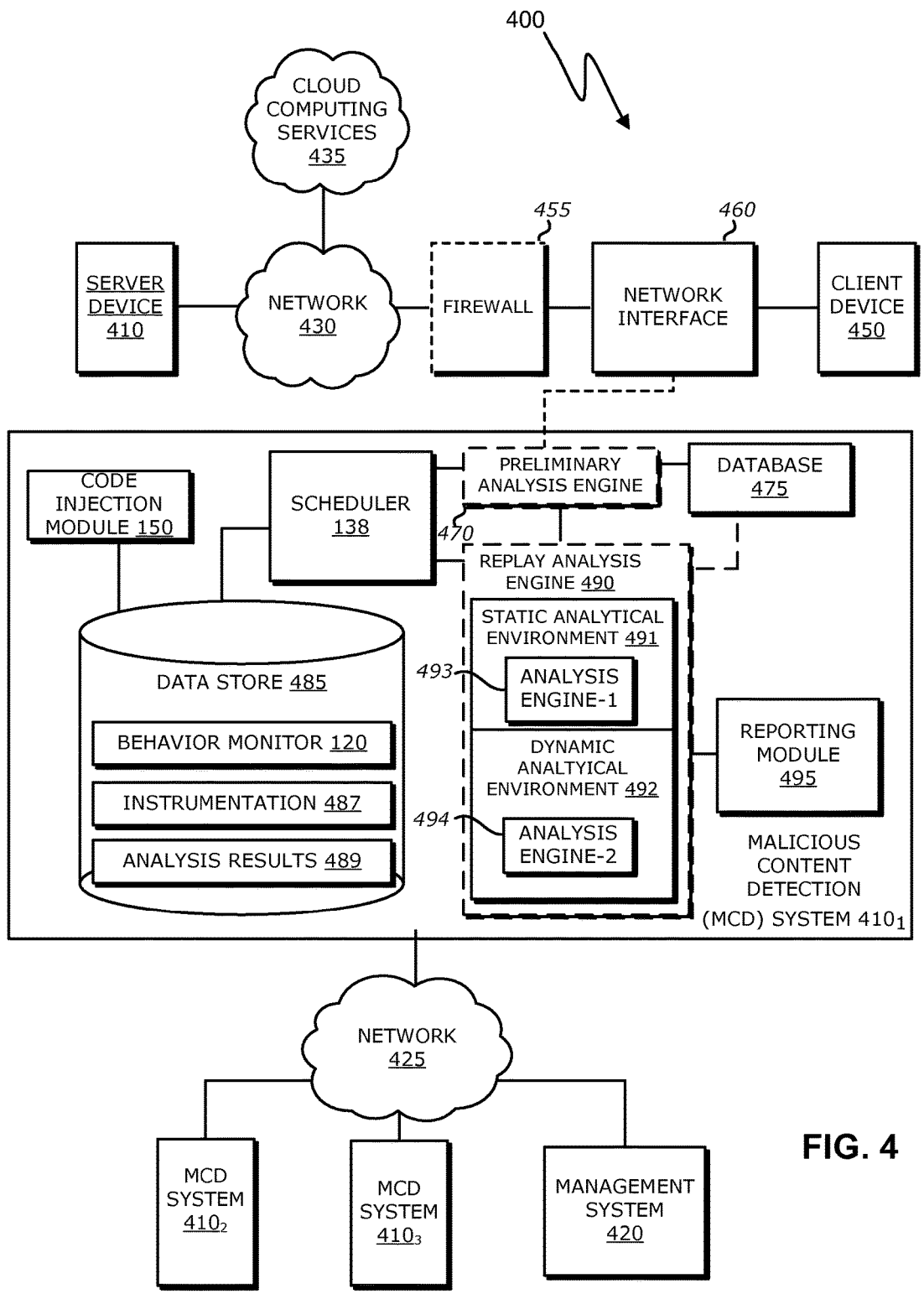
FIG. 4 is a block diagram of an illustrative computer network system having a malicious content detection system in accordance with a further illustrative embodiment.

Referring to FIG. 4, an exemplary block diagram of a communication system 400 deploying a plurality of malware content detection (MCD) systems 410$_1$-410$_N$ (N>1, e.g. N=3) communicatively coupled to a management system 420 via a network 430 is shown.

The malware content detection (MCD) systems 410$_1$-410$_N$ may represent any of the malicious content detection systems described above, such as, for example, detection system 100 of FIG. 1, which includes code injection module 150 to inject a new code segment to replace an original code segment of a program for malware detection or behavior monitoring as described above. In some embodiments described above, more or less components may be present in the communication system 400. For example, the MCD may not be connected to a network interface and instead may provide local monitoring of directly connected or stored content.

In general, management system 420 is adapted to manage MCD systems 410$_1$-410$_N$. For instance, management system 420 may be adapted to cause malware identifiers generated as a result of malware detection of behavior monitoring by any of MCD systems 410$_1$-410$_N$ to be shared with one or more of the other MCD systems 410$_1$-410$_N$ including, for example, where such sharing is conducted on a subscription basis.

Herein, according to this embodiment of the invention, first MCD system 410$_1$ is an electronic device that is adapted to (i) receive network traffic that is routed over a communication network 430 between at least one server device 440 and at least one client device 450 and (ii) monitor, in real-time, content within the network traffic. More specifically, first MCD system 410$_1$ may be configured to inspect content received via communication network 430 and identify "suspicious" objects or content specimens. In other embodiments, the objects or specimens may be stored locally within the MCD system, or directly coupled to the MCD system (e.g., USB or removable media). An object or specimen is identified as "suspicious" when it is assessed by an optional preliminary analysis engine 470, with a certain level of likelihood, that at least one characteristic identified during inspection of the object indicates the presence of malware. When a preliminary analysis engine does not exist to provide an initial identification, the identification may be provided or pre-tagged by an external source, or alternatively the system may assume the object will be scheduled for monitoring, and/or analysis.

Thereafter, the "suspicious" object may be scheduled by scheduler 138 to be analyzed within an optional replay analysis engine 490. Replay analysis engine 490 provides a static analytical environment 491, and a dynamic analytical environment 492. "Replay" denotes execution or other processing of the object. In some embodiments, replay analysis engine 490 can contain one of a static or dynamic analytical environment or neither a static nor dynamic analytical environment.

The static analytical environment 491 comprises a first analysis engine 493 that is adapted to conduct static malware detection or behavior monitoring operations, such as comparisons between binary content from the network traffic and suspected malware identifiers (e.g., alphanumeric patterns associated with known or suspected malware, etc.) for example. In one embodiment, the preliminary analysis engine 470 and the static analytical engine 491 may be combined. The dynamic analytical environment 492 comprises a second analysis engine 494, which includes at least instrumentation control logic operating in concert with VM(s) as described herein. The second analysis engine 494 is adapted to detect whether the suspicious object may include malware by execution of one or more VMs that are configured to simulate the receipt and processing of the object under analysis ("analyzed object") targeted for the client device 450. In some embodiments, the BMM as described above may be integrated into one or more of the analysis engines described above. The BMM may also be stored on data store 485 to be accessed by the VMM and code injection module 150.

The VM(s) analyzes or monitors (e.g., BMM) the behaviors resulting from processing the object, which behaviors may have occurred if the targeted client device 450 processed the object. These behaviors are provided as malware analysis results logic 489 within replay analysis engine 490. The behaviors may include expected behaviors as well as anomalous behaviors accompanying or resulting from the processing of the object. Examples of anomalous behavior may include, but are not limited or restricted to unusual network transmissions, unusual changes in performance, or the like.

In response to the malware analysis results, instrumentations of the VM may be altered transparent to the virtualized operating system of the VM so as to re-configure the VM to focus further analysis on a particular exploit or family of exploits that are more likely to be present within the network traffic based on the malware analysis results already provided.

Herein, first analysis engine 493 and the second analysis engine 494 may operate on the analyzed content concurrently or may operate on the analyzed content sequentially. For sequential operations, the first analysis engine normally performs static analysis on the analyzed content prior to the second analysis engine 494 performing dynamic analysis on that content.

According to this embodiment of communication system 400, first MCD system 410$_1$ may be a web-based security appliance that is configured to inspect ingress data traffic, identify whether content associated with the data traffic may include malware, and if so, conduct a deeper analysis of the content. This deeper analysis is conducted in the replay analysis engine 490 to detect anomalous and undesired behaviors that would be present if the data traffic were actually processed by an electronic device such as client device 450.

The particulars of this analysis are described below.

The communication network 430 may include a public computer network such as the Internet, in which case an optional firewall 455 (represented by dashed lines) may be interposed between communication network 430 and client device 450. Alternatively, the communication network 430 may be a private computer network such as a wireless telecommunication network, wide area network, or local area network, or a combination of networks.

The first MCD system 410$_1$ is shown as being coupled with the communication network 430 (behind the firewall 455) via a network interface 460. The network interface 460 operates as a data capturing device (sometimes referred to as a "tap" or "network tap") that is configured to receive data traffic propagating to/from the client device 450 and provide content from the data traffic to the first MCD system 410$_1$.

According to one embodiment of the disclosure, the network interface 460 is configured to receive and copy content from the network traffic targeted for client device 450 normally without an appreciable decline in performance by the server device 440, the client device 450, or the communication network 430. The network interface 460 may copy any portion of the content, for example, any number of data packets. According to another embodiment of the disclosure, the network interface 460 is an in-line device that intercepts and routes the content, being some or all of the network traffic, to first MCD system 410$_1$. Where the network traffic does not contain suspicious object, the network traffic is returned back to the network interface 460 for re-routing to the targeted destination (e.g., client device 450).

In some embodiments, the network interface 460 may capture metadata from network traffic intended for client device 450, where the metadata is used to determine the software profile and particular VM instrumentation(s) for the VM(s), if further malware analysis is needed. The metadata may be associated with the server device 440 and/or the client device 450. In other embodiments, preliminary analysis logic 470 (described herein) may obtain or generate the metadata associated with the network traffic.

It is contemplated that, for any embodiments where the first MCD system 410$_1$ is implemented as an dedicated appliance or a dedicated electronic device, the network interface 460 may include an assembly integrated into the appliance or networking logic that includes network ports, network interface card or the like. The integrated assembly or networking logic provides coupling to the communication network 430 in order to non-disruptively "tap" network traffic propagating through firewall 455 and provide the network traffic (or a copy thereof) to the preliminary analysis logic 470. In other embodiments, the network interface 460 can be integrated into an intermediary device in the communication path (e.g. in firewall 455, router, switch or other network device) or can be a standalone component, such as an appropriate commercially available network tap. In virtual environments, a virtual tap (vTAP) can be used to duplicate traffic from virtual networks.

Referring still to FIG. 4, the first MCD system 410$_1$ comprises preliminary analysis logic 470, a database 475, a scheduler 138, a data store 485, replay analysis engine 490 and a reporting module 495. In some embodiments, the network interface 460 may be contained within the first MCD system 410$_1$. Also, preliminary analysis logic 470, scheduler 138 and/or replay analysis engine 490 may be software modules executed by a processor that receives the suspicious object, performs malware analysis and is adapted to access one or more non-transitory storage mediums operating as database 475, data store 485 and/or reporting module 495. In some embodiments, the preliminary analysis engine 470 may be one or more software modules executed by a processor, and the scheduler 138 and the replay analysis engine 490 may be one or more software modules executed by a different processor, where the two processors are possibly located at geographically remote locations, and communicatively coupled for example via a network.

In general, the preliminary analysis engine 470 serves as a filter to permit subsequent malware analysis only on certain portions of the incoming content, which effectively conserves system resources and provides faster response time in determining the presence of malware within analyzed object(s). As an ancillary benefit, by analyzing only a portion of incoming content that may have "exploits" (e.g. one or more object(s) that may be exploited by malware), a greater number of VMs (and VM processes) may be supported to run concurrently with each other or for longer periods of time.

As illustrated in FIG. 4, according to one embodiment of the disclosure, the preliminary analysis logic 470 receives a copy of content associated with network traffic from the network interface 460 and conducts operations in accordance with rules stored in database 475 to determine if any of the content includes "suspicious" objects. The preliminary analysis logic 470 may examine an object within the content without executing or opening the object.

For example, the preliminary analysis logic 470 may examine the attributes (and/or metadata) for content associated with an object in order to determine whether the object originated from a blacklisted, malicious server or originated from a region (or networking device) that is providing a high level of content having malware. Also, the preliminary analysis logic 470 may examine the content itself to determine whether such content includes objects that have a higher probability of including malware than other objects (e.g., attached files in email messages, embedded URLs, etc.). According to one embodiment of the disclosure, the preliminary analysis logic 470 flags "suspicious" objects.

Thereafter, according to one embodiment of the invention, the preliminary analysis logic 470 may be adapted to transmit at least a portion of the metadata or attributes associated with the suspicious object, which identifies attributes of the targeted client device 450, to scheduler 138. The metadata and/or attributes are used by the scheduler 138 to determine the software profile(s) for the VM(s) as well as the VM instrumentation(s) needed for processing the suspicious object in the sandboxed virtual environment.

More specifically, scheduler 138 comprises queues and logic for identifying the type of object targeted for replay (e.g. HTTP traffic, PDF files, Flash files, etc.), identifying the software profile and VM instrumentation needed for the VM, and determining when the object is ready for processing in the dynamic analytical (virtual) environment of the replay analysis engine 490. In another embodiment of the disclosure, the replay analysis engine 490 may be adapted to receive one or more messages (e.g. data packets) from the preliminary analysis logic 470 and analyze the message(s) to identify what VM(s) is(are) to be deployed. Replay analysis engine 490 would provide signaling to scheduler 138 to retrieve the VM(s) with particular VM instrumentation(s).

For instance, as an illustrative example, the suspicious content under analysis may include an email message that was generated, under control of Windows® 8 Operating System, using a certain version (ver. X) of Windows® Outlook. The email message further includes a Portable Document Format (PDF) attachment in accordance with a particular version (ver. Y) of Adobe® Acrobat®. Upon determining that the email message includes a suspicious object, preliminary analysis logic 470 provides software profile information to scheduler 138 to identify a particular type of VM instrumentation needed to conduct malware analysis of the suspicious object. According to this illustrative example, the software profile information would include the software noted above or, if not available to the system, the nearest appropriate software that are available.

During run-time, a VM provides malware analysis results to instrumentation control logic 250 of FIG. 2, which analyzes the malware analysis results and, in response to identifying an event, notifies the VM to request a different instrumentation. The event may include detection of an exploit through analysis of the malware analysis results or perhaps an occurrence of a first timeout condition (e.g., a predetermined period of run-time has elapsed). Hence, the instrumentation control logic 250 dynamically alters a VM process within the VM to implement a different VM instrumentation in order to optimize subsequent exploit detection processes.

The data store 485 is configured to store one or more VM disk files, where each VM disk file includes a code injection target program (e.g., BMM, or VM instrumentation).

Capable of being pre-stored, uploaded and/or erased automatically via management system 420 or locally uploaded by an administrator, the VM instrumentations provide different functionality to increase the likelihood of detecting potential exploits. For example, a first VM disk file may include a first VM instrumentation directed to analysis of JavaScript® code in accordance with a first type of JavaScript® engine and a second VM disk file may include a second VM instrumentation directed to deeper-level analysis of JavaScript® code in accordance with a different type of JavaScript® engine.

The dynamic alteration of the VM instrumentation is directed to select a new VM instrumentation that may be directed to a recently detected exploit (or family of exploits) that commonly causes or is related to characteristics associated with anomalous behavior identified in the malware analysis results 489 (e.g., unusual network transmissions, unusual changes in performance, etc.). In fact, some VM instrumentations may be directed to detecting the same or related exploit types but feature different functionality (e.g. faster processing, specifically targeted processing, different software components, etc.).

The replay analysis engine 490 may flag a suspicious object as malware according to the observed anomalous behavior detected by the VM. The reporting module 495 may issue alerts indicating the presence of malware, and using pointers and other reference information, identify what portion of the "suspicious" object may contain malware. Additionally, the server device 440 may be added to a list of malicious network content providers, and future network transmissions originating from the server device 440 may be blocked from reaching their intended destinations, e.g., by firewall 455.

Of course, in lieu of or in addition to MCD systems $410_1$-$410_N$, it is contemplated that cloud computing services 435 may be implemented with the replay analysis engine 490 to conduct VM-based dynamic analysis on one or more objects within the network traffic, and/or perform dynamic changes in VM instrumentation, as described herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for behavior monitoring, comprising:
    loading, by a virtual machine monitor (VMM), a first code section of a target program into a first memory page allocated to a virtual machine (VM);
    injecting, by the VMM, a second code section into the target program by changing an address at which the target program executes from a first address to a second address, the first address being a location of the first code section and the second address being a location of the second code section, wherein the second code section includes a plurality of Instructions directed toward detecting a first type of malware, wherein the second code section is injected via execution of an injection thread while one or more threads processing a content specimen are paused; and
    determining the content specimen is suspicious when an anomalous behavior of the content specimen is detected according to execution of the injected second code section, wherein the second code section is injected after the target program and the content specimen have been loaded within the VM.

2. The computer-implemented method of claim 1, wherein a memory location of the first memory page is an address reserved in response to creating an executable of the target program.

3. The computer-implemented method of claim 1, further comprising:
    detecting, by the VMIM, an injection ready status of the target program that has been loaded in the VM, wherein the injection ready status is a waiting state implemented by code of the target program to allow a code injection module to inject the second code section prior to executing the first code section.

4. The computer-implemented method of claim 1, further comprising: detecting, by the VMIM, a malware threat detection analysis of the target program; and selecting one of a plurality of code sections for injection in response to the respective behavior of the content specimen.

5. The computer-implemented method of claim 1, wherein the second code section is received by the VMM from a remote facility over a network after the target program has been received by a data processing system in which the VM and the VMM are executed.

6. The computer-implemented method of claim 1, wherein the first address and second address are both physical addresses, the first address being different than the second address.

7. The computer-implemented method of claim 1, wherein the second code section initiates a memory dump to capture information associated with the content specimen.

8. The computer-implemented method of claim 1, wherein the anomalous behavior is a behavior that identifies that the content specimen is suspicious.

9. A non-transitory machine-readable medium storing instructions, which when executed by a processor, cause the processor to perform a method for behavior monitoring, the method comprising:
    loading a first code section of a target program into a first memory page of a virtual machine (VM) hosted by a virtual machine monitor (VMM);
    injecting, by the VMM, a second code section into the target program by changing an address at which the target program executes the target program from a first address to a second address, the first address being a location of the first code section and the second address being a location of the second code section, wherein the second code section includes a plurality of instructions directed toward detecting a first type of malware, wherein the second code section is injected via execution of an injection thread while one or more threads processing a content specimen are paused; and
    determining the content specimen is suspicious when an anomalous behavior of the content specimen is detected according to the injected second code section instead of the first code section, wherein the second code section is injected after the target program and the content specimen have been loaded within the VM.

10. The non-transitory machine-readable medium of claim 9, wherein a memory location of the first memory page is an address reserved in response to creating an executable of the target program.

11. The non-transitory machine-readable medium of claim 9, further comprising:
    detecting, by the VMIM, an injection ready status of the target program that has been loaded in the VM, wherein the injection ready status is a waiting state implemented by code of the target program to allow a code injection module to inject the second code section prior to executing the first code section.

12. The non-transitory machine-readable medium of claim 9, further comprising:
    detecting, by the VMIM, a malware threat detection analysis of the target program; and
    selecting one of a plurality of code sections for injection in response to the respective behavior of the content specimen.

13. The non-transitory machine-readable medium of claim 9, wherein the second code section is received by the VMM from a remote facility over a network after the target program has been received by a data processing system in which the VM and the VMM are executed.

14. The non-transitory machine-readable medium of claim 9, wherein the first address and second address are both physical addresses, the first address being different than the second address.

15. The non-transitory machine-readable medium of claim 9, wherein the second code section initiates a memory dump to capture information associated with the content specimen.

16. The non-transitory machine-readable medium of claim 9, wherein the anomalous behavior is a behavior that identifies that the content specimen is suspicious.

17. A malicious content detection system, comprising:
one or more processors; and
a storage communicatively coupled to the one or more processors, the storage having stored thereon,
 a controller configured to load a first code section of a behavior module into a first memory page of a virtual machine (VM), the behavior module to monitor and detect whether a content specimen within the VM is malware,
 a code injection module configured to inject a second code section into the behavior module by changing an address at which the target program executes from a first address to a second address, the first address being a location of the first code section and the second address being a location of the second code section, wherein the second code section includes a plurality of instructions directed toward detecting a first type of malware, wherein the second code section is injected via execution of an injection thread while one or more threads processing a content specimen are paused, and
 the behavior module further configured to determine the content specimen is suspicious when an anomalous behavior of the content specimen is detected according to execution of the second code section, wherein the second code section is injected after the behavior module and the content specimen have been loaded within the VM.

18. The malicious content detection system of claim 17, wherein a memory location of the first memory page is an address reserved in response to creating an executable of the target program.

19. The malicious content detection system of claim 17, wherein the code injection module is further configured to cause the system to:
 detect an injection ready status of the behavior module that has been loaded in the VM, wherein the injection ready status is a waiting state implemented by the behavior module code to allow the code injection module to inject the second code section prior to executing the first code section.

20. The malicious content detection system of claim 17, wherein the second code section is received by the code injection module from a remote facility over a network after the behavior module has been received by a data processing system in which the VM and the code injection module are executed.

21. The malicious content detection system of claim 17, wherein the first address and second address are both physical addresses, the first address being different than the second address.

22. The system malicious content detection of claim 17, wherein the second code section initiates a memory dump to capture information associated with the content specimen.

23. The malicious content detection system of claim 17, wherein the anomalous behavior is a behavior that identifies that the content specimen is suspicious.

\* \* \* \* \*